United States Patent
Tao et al.

(10) Patent No.: US 10,810,872 B2
(45) Date of Patent: Oct. 20, 2020

(54) USE SUB-SYSTEM OF AUTONOMOUS DRIVING VEHICLES (ADV) FOR POLICE CAR PATROL

(71) Applicant: Baidu USA LLC, Sunnyvale, CA (US)

(72) Inventors: Jiaming Tao, Sunnyvale, CA (US); Liangliang Zhang, Sunnyvale, CA (US); Yifei Jiang, Sunnyvale, CA (US); Dong Li, Sunnyvale, CA (US); Fan Zhu, Sunnyvale, CA (US); Jiangtao Hu, Sunnyvale, CA (US)

(73) Assignee: BAIDU USA LLC, Sunnyvale, CA (US)

(*) Notice: Subject to any disclaimer, the term of this patent is extended or adjusted under 35 U.S.C. 154(b) by 0 days.

(21) Appl. No.: 16/051,031

(22) Filed: Jul. 31, 2018

(65) Prior Publication Data
US 2020/0043326 A1 Feb. 6, 2020

(51) Int. Cl.
| | |
|---|---|
| B60R 11/04 | (2006.01) |
| G08G 1/054 | (2006.01) |
| G08G 1/042 | (2006.01) |
| G08G 1/017 | (2006.01) |
| G08G 1/02 | (2006.01) |
| G08G 1/04 | (2006.01) |
| G06K 9/00 | (2006.01) |
| G07C 5/00 | (2006.01) |

(52) U.S. Cl.
CPC ............ *G08G 1/0175* (2013.01); *B60R 11/04* (2013.01); *G06K 9/00825* (2013.01); *G07C 5/008* (2013.01); *G08G 1/054* (2013.01)

(58) Field of Classification Search
CPC .................................................. G08G 1/0175
See application file for complete search history.

(56) References Cited

U.S. PATENT DOCUMENTS

| | | | |
|---|---|---|---|
| 2002/0186297 A1 | 12/2002 | Bakewell | |
| 2011/0084855 A1 | 4/2011 | Simon | |
| 2013/0275031 A1* | 10/2013 | Johnson | G08G 1/0104 701/118 |
| 2014/0081848 A1* | 3/2014 | Leopold | G06Q 20/327 705/39 |

(Continued)

OTHER PUBLICATIONS

Gatso Millia, "radar mobile mobile nouvelle generation ETM," XP055645264, Dec. 1, 2015, 11 pages.

*Primary Examiner* — Joseph H Feild
*Assistant Examiner* — Pameshanand Mahase
(74) *Attorney, Agent, or Firm* — Womble Bond Dickinson (US) LLP

(57) ABSTRACT

In one embodiment, a method, apparatus, and system for automatically detecting and notifying a user of a traffic rule violation using sensors and a perception module of an autonomous driving vehicle is disclosed. The operations performed comprise: capturing surrounding road traffic information at an autonomous driving vehicle (ADV) based on sensor data obtained from a plurality of sensors of the ADV; automatically detecting at the ADV a traffic rule violation of a first vehicle within a perception range of the ADV based on the surrounding road traffic information and a set of pre-configured traffic rules maintained by the ADV, including analyzing the surrounding road traffic information in view of the pre-configured traffic rules; and generating an alert in response to the detected traffic rule violation.

21 Claims, 7 Drawing Sheets

(56) References Cited

U.S. PATENT DOCUMENTS

| | | | |
|---|---|---|---|
| 2016/0210857 A1* | 7/2016 | Gao | G08G 1/09 |
| 2017/0075888 A1* | 3/2017 | Ekin | G06F 17/3028 |
| 2017/0116851 A1* | 4/2017 | Burke | G08G 1/0112 |
| 2018/0018869 A1* | 1/2018 | Ahmad | G08G 1/205 |
| 2019/0302781 A1* | 10/2019 | Tao | G08G 1/0965 |

* cited by examiner

USE SUB-SYSTEM OF AUTONOMOUS DRIVING VEHICLES (ADV) FOR POLICE CAR PATROL

TECHNICAL FIELD

Embodiments of the present disclosure relate generally to operating autonomous vehicles. More particularly, embodiments of the disclosure relate to automatically detecting traffic rule violations in the perception range of an autonomous vehicle using information obtained from sensor systems and a perception module.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

Presently to detect traffic rule violations in a road traffic scenario, a police officer riding in a police patrol vehicle needs to make observations of the surrounding environment and find the violations based on his/her own judgment. The process requires constant concentration of the police officer, and can be mentally taxing. Moreover, a police officer has only limited focus, and cannot make observations in all the directions at once.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Figure 1:
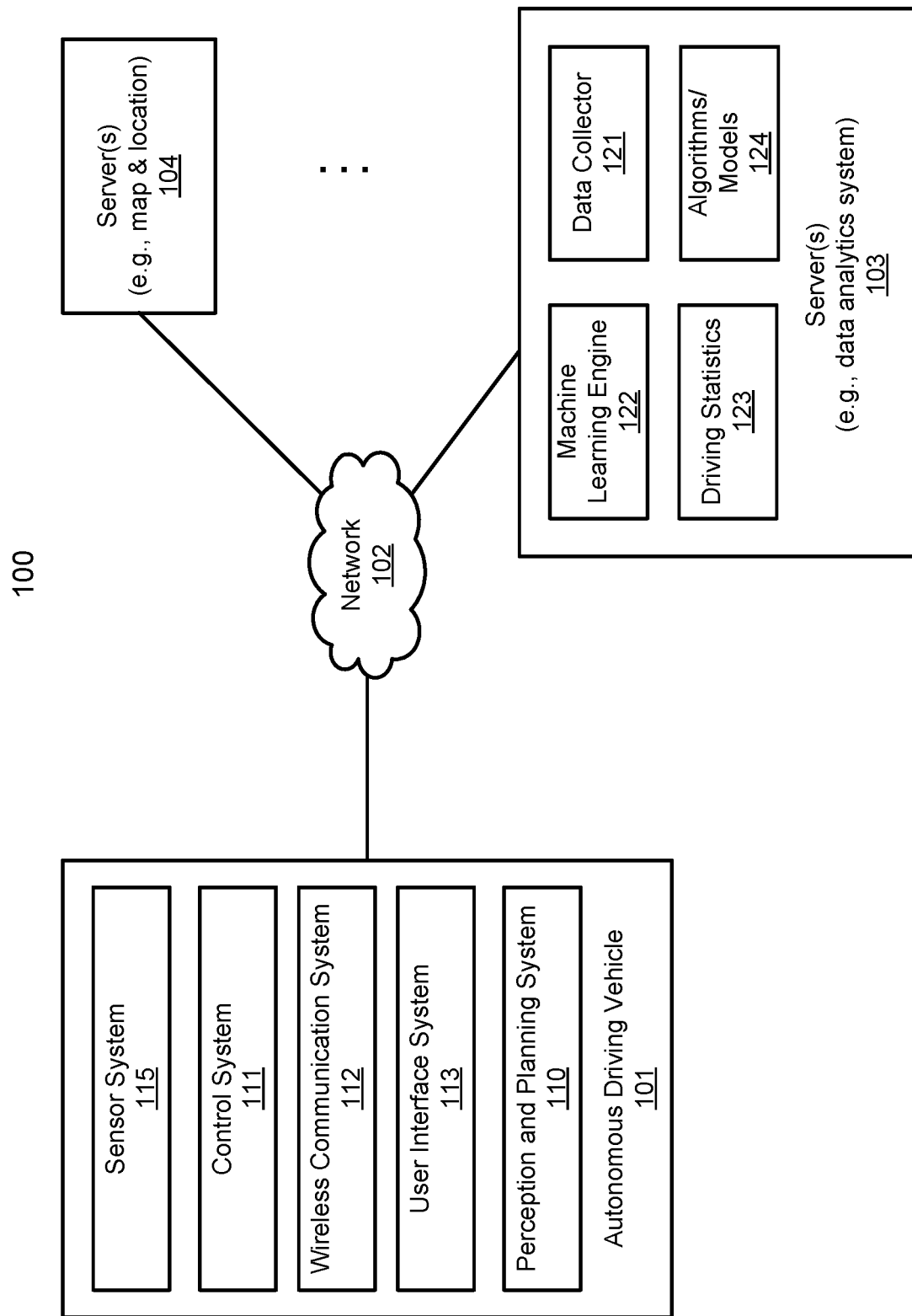
FIG. 1 is a block diagram illustrating a networked system according to one embodiment.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

According to some embodiments, a method, apparatus, and system for automatically detecting and notifying a user of a traffic rule violation using sensors and a perception module of an autonomous driving vehicle is disclosed. The operations performed comprise: capturing surrounding road traffic information at an autonomous driving vehicle (ADV) based on sensor data obtained from a plurality of sensors of the ADV; automatically detecting at the ADV a traffic rule violation of a first vehicle within a perception range of the ADV based on the surrounding road traffic information and a set of pre-configured traffic rules maintained by the ADV, including analyzing the surrounding road traffic information in view of the pre-configured traffic rules; and generating an alert in response to the detected traffic rule violation.

According to one embodiment, in response to the sensor data obtained from various sensors mounted on an ADV, an analysis is performed on the sensor data to detect a first of one or more vehicles surrounding the ADV and the behavior of the first vehicle, in view of a set of preconfigured traffic rules to determine whether the first vehicle has violated the traffic rules. In addition, one or more images of the first vehicle may be captured using a camera mounted on the ADV, which may be a part of sensor data. If it is determined that the first vehicle has violated the traffic rules, an alert is generated. The alert and the image of the first vehicle may be displayed on a display device within the ADV.

The alert and the image of the first vehicle, as well as the perception data representing the driving environment surrounding the ADV, may be stored in a persistent storage device maintained by the ADV. Such information may be utilized as proof of traffic violation. In addition or alternatively, the alert and the image of the first vehicle, as well as the perception data representing the driving environment surrounding the ADV, may be transmitted to a centralized server over a network to be stored therein. A subsequent analysis may be performed offline on the collected data at the centralized server.

The first vehicle may be one of the vehicles located within a predetermined proximity of the ADV. For example, the first vehicle may be located behind the rear end of the ADV and the traffic violation may be captured and detected by sensors mounted near the rear end of the ADV that a driver of the ADV normally would not pay sufficient attention to. By utilizing the sensors mounted on the ADV, certain traffic violations that normally would not be detected can be captured without user intervention of the people riding in the ADV. In addition, since the traffic information is transmitted to a centralized server, the detection of the traffic violation can be performed offline, such that a rider of the ADV (e.g., law enforcement officer) does not need to try to pull over the violation vehicle, particularly, when the officer is on a more important mission.

FIG. 1 is a block diagram illustrating an autonomous vehicle network configuration according to one embodiment of the disclosure. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) severs, or location servers, etc.

An autonomous vehicle refers to a vehicle that can be configured to in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode. Hereinafter the terms "autonomous vehicle" and "autonomous driving vehicle" may be used interchangeably.

In one embodiment, autonomous vehicle 101 includes, but is not limited to, perception and planning system 110, vehicle control system 111, wireless communication system 112, user interface system 113, infotainment system 114, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
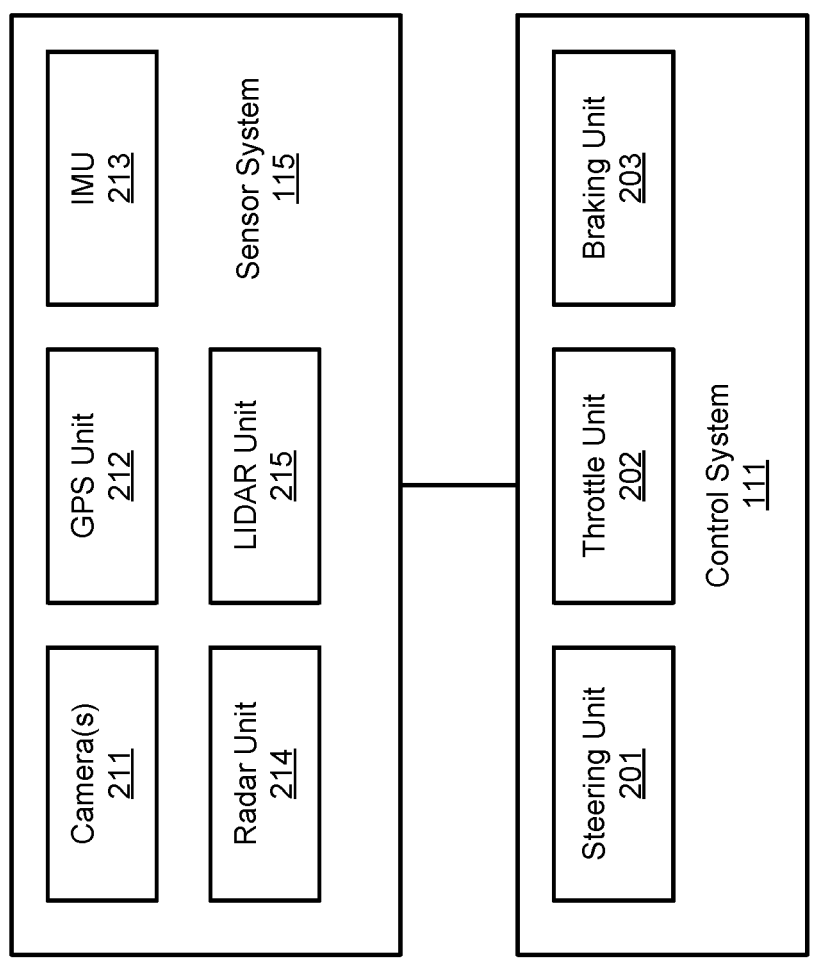
FIG. 2 is a block diagram illustrating an example of an autonomous vehicle according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn control the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyboard, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either autonomous vehicles or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

Based on driving statistics 123, machine learning engine 122 generates or trains a set of rules, algorithms, and/or predictive models 124 for a variety of purposes. In one embodiment, algorithms 124 may include an algorithm to detect whether an object (e.g., a vehicle, a biker, a pedestrian) has violated a set of traffic rules based on the behaviors of the object. In addition, server 103 may further include an analysis module to analyze the traffic information captured by and collected from a number of ADVs to determine whether any object that has violated the traffic rules. Algorithms 124 can then be uploaded on ADVs to be utilized during autonomous driving in real-time. Note that server 103 may transmit the violation information to a law enforcement server to be further processed therein (e.g., issuing traffic violation tickets). Alternatively, server 103 may be implemented as a part of the law enforcement server.

Figure 3A:
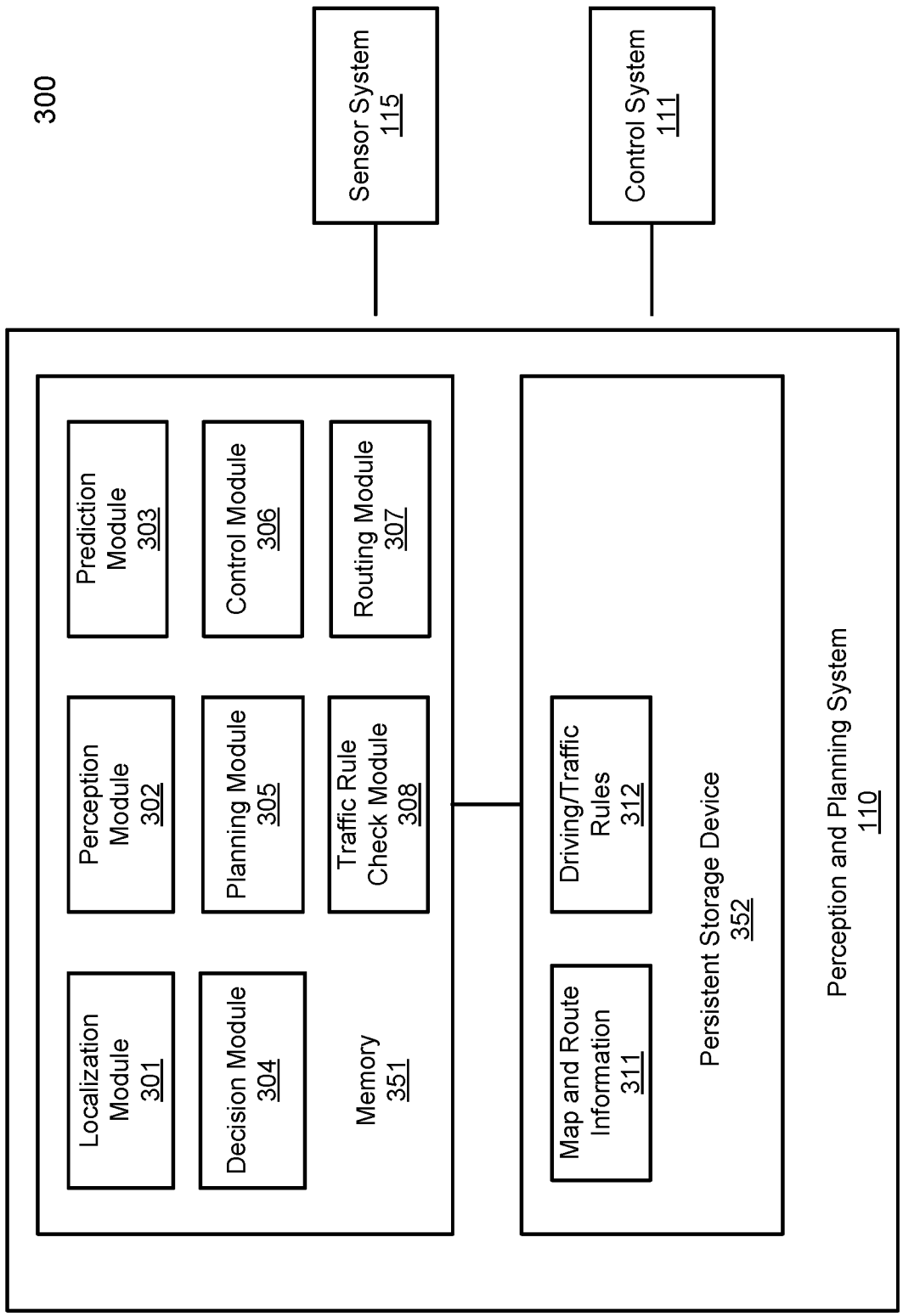
FIGS. 3A-3B are block diagrams illustrating an example of a perception and planning system used with an autonomous vehicle according to one embodiment.
Figure 3B:
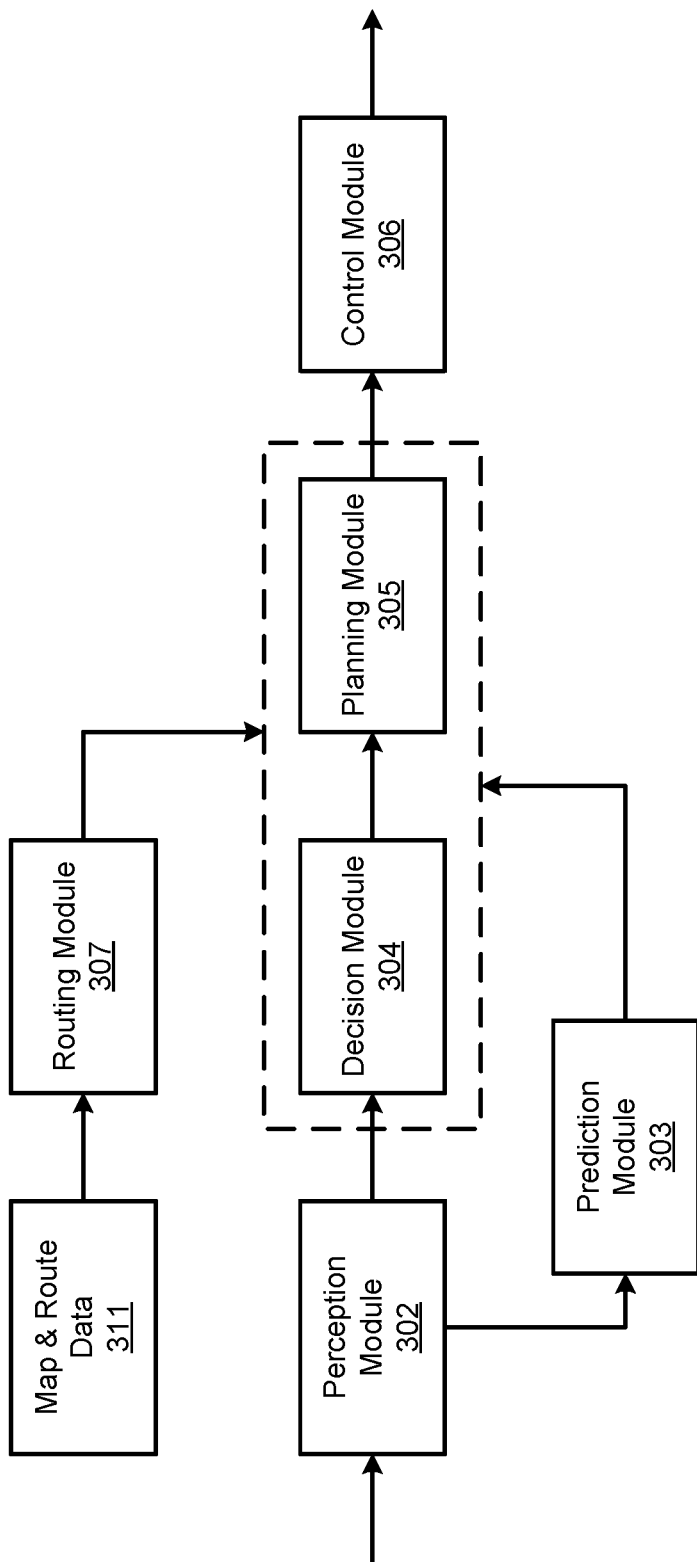

FIGS. 3A and 3B are block diagrams illustrating an example of a perception and planning system used with an autonomous vehicle according to one embodiment. System 300 may be implemented as a part of autonomous vehicle 101 of FIG. 1 including, but is not limited to, perception and planning system 110, control system 111, and sensor system 115. Referring to FIGS. 3A-3B, perception and planning system 110 includes, but is not limited to, localization module 301, perception module 302, prediction module 303, decision module 304, planning module 305, control module 306, routing module 307, traffic rule check module 308.

Some or all of modules 301-308 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-308 may be integrated together as an integrated module.

Localization module 301 determines a current location of autonomous vehicle 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration, traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts what the object will behave under the circumstances. The prediction is performed based on the perception data perceiving the driving environment at the point in time in view of a set of map/rout information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select and modify one of the most optimal route in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route for the autonomous vehicle, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 mile per hour (mph), then change to a right lane at the speed of 25 mph.

Based on the planning and control data, control module 306 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, steering commands) at different points in time along the path or route.

In one embodiment, the planning phase is performed in a number of planning cycles, also referred to as driving cycles, such as, for example, in every time interval of 100 milliseconds (ms). For each of the planning cycles or driving cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the autonomous vehicle. For example, the navigation system may determine a series of speeds and directional headings to affect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

Traffic rule check module 308 may check the perception information obtained at perception module 302 (e.g., the surrounding road traffic information) against the driving/traffic rules 312, and automatically detect traffic rule violations of one or more other vehicles when they happen within the perception range of the autonomous vehicle. The traffic rule violations that can be detected by the traffic rule check module may include, but are not limited to, speed violations, traffic light violations, stop sign violations, failure to yield (to a pedestrian or another vehicle) violations, exterior lighting failures, or any combination thereof. The above non-exhaustive list is for illustrative purposes only. Still other traffic rule violations may also be detected by the traffic rule check module 308.

Figure 4:
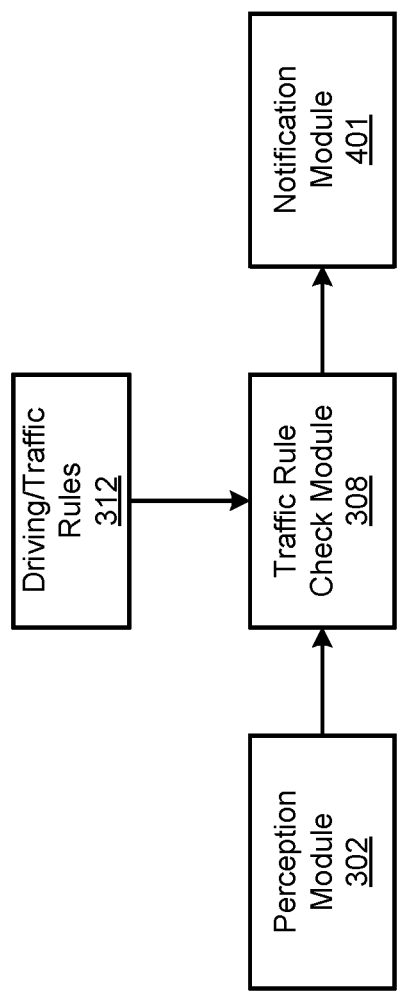
FIG. 4 is a block diagram illustrating various modules used with an autonomous vehicle according to one embodiment.

FIG. 4 is a block diagram 400 illustrating various modules used with an autonomous vehicle according to one embodiment. A method for automatically detecting and notifying a user of a traffic rule violation may be implemented with the modules of FIG. 4. Some or all modules or sub-modules illustrated in FIG. 4 may be implemented in hardware, software, or a combination thereof. The ADV may be a police patrol vehicle. Perception module 302 captures surrounding road traffic information at an ADV using sensors of the ADV. The sensors utilized may comprise cameras 211, GPS unit 212, IMU 213, Radar unit 214, LIDAR unit 215, or a combination thereof. The surrounding road traffic information may comprise, but is not limited to, lane configuration, road surface markings, traffic light signals, speed, trajectory, relative position of other vehicles, conditions of exterior lights of other vehicles, pedestrians, buildings, obstacles, pedestrian crossings, or any other traffic related signs (e.g., stop signs, yield signs), or any combination thereof. The above non-exhaustive list is for illustrative purposes only. The surrounding road traffic information may comprise still other information.

Traffic rule check module 308 detects at the ADV a traffic rule violation of another vehicle in a perception range of the ADV based on the surrounding road traffic information and pre-stored traffic rules 312. It should be appreciated that the traffic rules 312 used at any particular moment may vary based on the location and jurisdiction (e.g., a particular country, state, city, etc.) where the ADV is operated. The detected traffic rule violation may be, but is not limited to, a speed violation, a traffic light violations, a stop sign violation, a failure to yield (to a pedestrian or another vehicle) violation, an exterior lighting failure, or any combination thereof. The above non-exhaustive list is for illustrative purposes only. The detected traffic rule violation may be yet another violation not mentioned above. Notification module 401 alerts a user (e.g., a police officer riding in the ADV) of the detected traffic rule violation. Accordingly, the user may take appropriate actions.

According to one embodiment, traffic rule check module 308 (also referred to as a traffic violation detector or detection module) includes an analysis module (not shown). In response to the sensor data obtained from various sensors mounted on an ADV, the analysis module performs an analysis on the sensor data to detect a first of one or more vehicles surrounding the ADV and the behavior of the first vehicle, in view of a set of preconfigured traffic rules to determine whether the first vehicle has violated the traffic rules. In addition, one or more images of the first vehicle (e.g., a license plate, a vehicle model or manufacturer, vehicle appearance such as color, shape, etc.) may be captured using a camera mounted on the ADV, which may be a part of the sensor data provided by sensor system 115. If it is determined that the first vehicle has violated the traffic rules, the notification module 401 generates an alert indicating that a traffic violation has been detected. The alert and a graphical representation (e.g., icon) or the image of the first vehicle may be displayed on a display device within the ADV. The graphical representation of the first vehicle may be displayed corresponding to a relative location or position with respect to the location of the ADV, such that the passenger of the ADV knows where the violation occurs. The relative location or position of the first vehicle may be determined based on the sensor data.

The alert and the image of the first vehicle, as well as the perception data representing the driving environment surrounding the ADV, may be stored in a persistent storage device maintained by the ADV. Such information may be utilized as proof of traffic violation. In addition or alternatively, the alert and the image of the first vehicle, as well as the perception data representing the driving environment surrounding the ADV, may be transmitted to a centralized server (e.g., server 103) over a network to be stored therein. A subsequent analysis may be performed offline on the collected data at the centralized server.

The first vehicle may be one of the vehicles located within a predetermined proximity of the ADV. For example, the first vehicle may be located behind the rear end of the ADV and the traffic violation may be captured and detected by sensors mounted near the rear end of the ADV that a driver of the ADV normally would not pay sufficient attention to. By utilizing the sensors mounted on the ADV, certain traffic violations, which normally may not be easily detected, can be captured without user intervention of the people riding in the ADV. In addition, since the traffic information is transmitted to a centralized server, the detection of the traffic violation can be performed offline, such that a rider of the ADV (e.g., law enforcement officer) does not need to pull over the violation vehicle at the point in time of the traffic violation, particularly, when the officer is on a more important mission. A traffic violation ticket can be issued to an owner of the violation vehicle in response to an analysis performed offline subsequently.

Note that the ADV in this situation may implemented as a part of a law enforcement vehicle (e.g., a police vehicle). Alternatively, an ADV may be one of the many ADVs that are ordinary vehicles or quasi-law enforcement vehicles participating to collect traffic data to help the enforcement system to detect any traffic violation. The final violation detection may be determined at a centralized facility.

Figure 5:
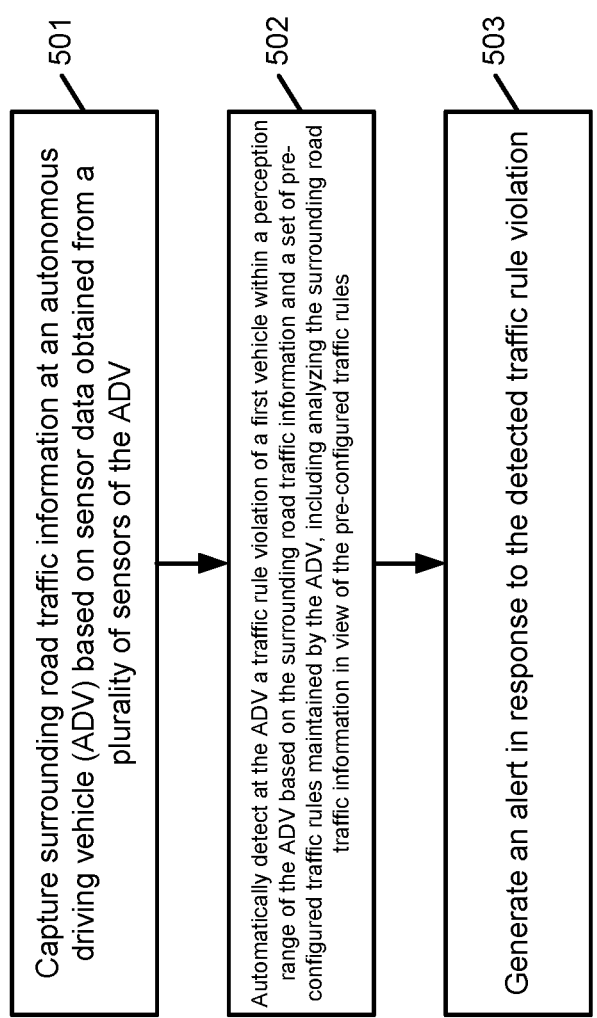
FIG. 5 is a flowchart illustrating an example method for automatically detecting and notifying a user of a traffic rule violation using sensors and a perception module of an autonomous vehicle, according to one embodiment of the disclosure.

FIG. 5 is a flowchart illustrating an example method 500 for automatically detecting and notifying a user of a traffic rule violation using sensors and a perception module of an autonomous vehicle, according to one embodiment of the disclosure. Process 500 may be performed by processing logic which may include software, hardware, or a combination thereof. For example, process 500 may be performed by traffic rule check module 308 as described above. At block 501, surrounding road traffic information may be captured at an autonomous driving vehicle (ADV) based on sensor data obtained from a plurality of sensors of the ADV. At block 502, a traffic rule violation of a first vehicle within a perception range of the ADV may be automatically detected at the ADV based on the surrounding road traffic information and a set of pre-configured traffic rules maintained by the ADV, including analyzing the surrounding road traffic information in view of the pre-configured traffic rules. At block 503, an alert may be generated in response to the detected traffic rule violation.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Therefore, with the assistance of the embodiments of the disclosure described herein, a police officer riding in an ADV may be freed from the mentally taxing task of finding traffic rule violations in the vicinity. The perception and traffic rule check abilities of the ADV enable automatic detection of traffic rule violations that take place within the perception range of the ADV in all directions with both speed and accuracy.

Figure 6:
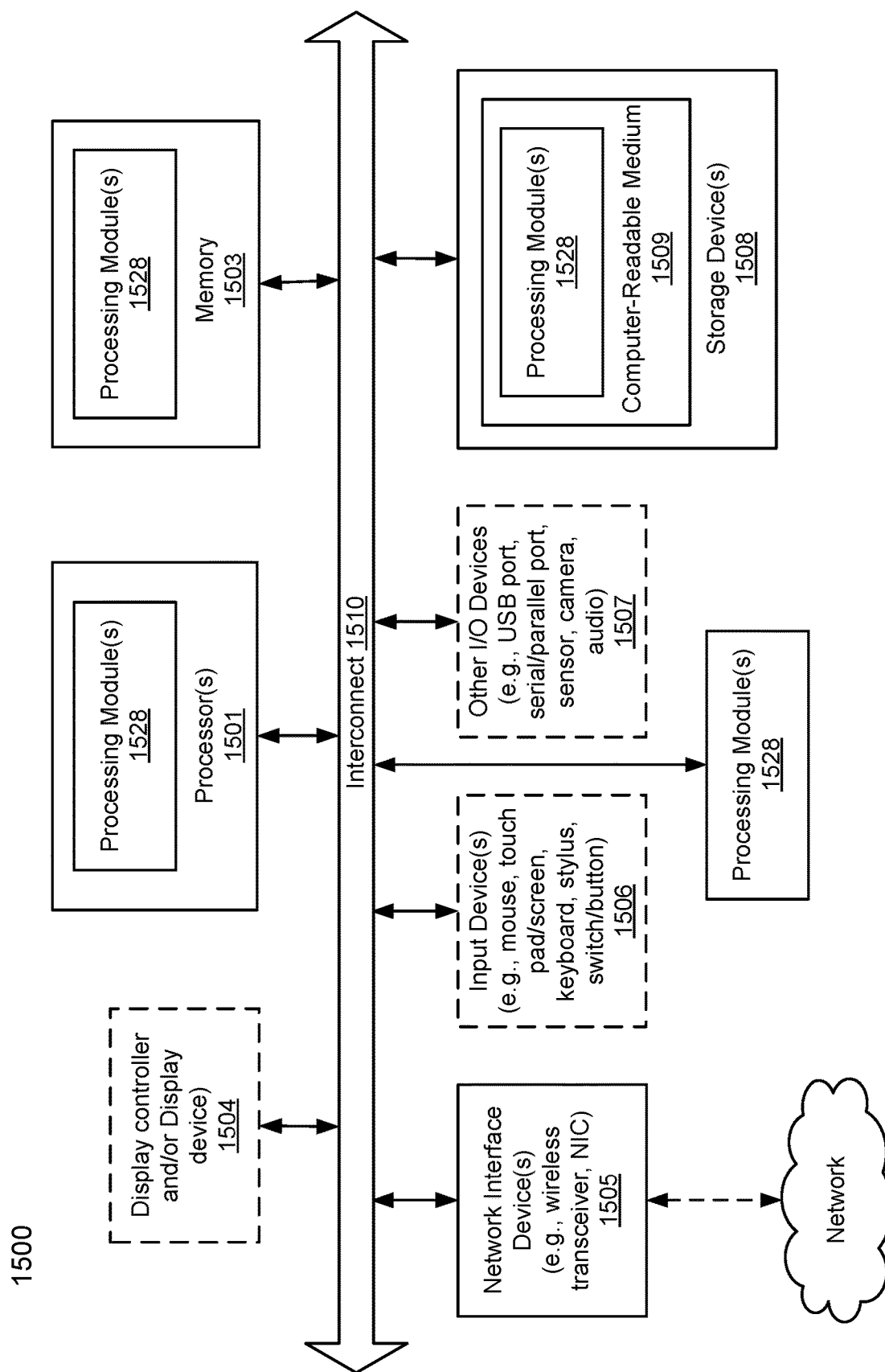
FIG. 6 is a block diagram illustrating a data processing system according to one embodiment.

FIG. 6 is a block diagram illustrating an example of a data processing system which may be used with one embodiment of the disclosure. For example, system 1500 may represent any of data processing systems described above performing any of the processes or methods described above, such as, for example, perception and planning system 110 or any of servers 103-104 of FIG. 1. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 connected via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Robot Operating System (ROS), Windows® operating system from Microsoft®, Mac OS®/iOS® from Apple, Android® from Google®, LINUX, UNIX, or other real-time or embedded operating systems.

System 1500 may further include IO devices such as devices 1505-1508, including network interface device(s) 1505, optional input device(s) 1506, and other optional device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including BIOS as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Processing module/unit/logic 1528 may represent any of the components described above, such as, for example, planning module 305, control module 306, perception module 302, traffic rule check module 308, notification module 401. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present disclosure. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present disclosure. It will also be appreciated that network computers, handheld computers, mobile phones, servers, and/or other data processing systems which have fewer components or perhaps more components may also be used with embodiments of the disclosure.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method, comprising:
    capturing surrounding road traffic information at an autonomous driving vehicle (ADV) based on sensor data obtained from a plurality of sensors of the ADV;
    maintaining, at the ADV, a set of pre-configured traffic rules;
    automatically detecting, at the ADV, a traffic rule violation of a first vehicle within a perception range of the ADV based on the surrounding road traffic information and the set of pre-configured traffic rules maintained by the ADV, including analyzing the surrounding road traffic information in view of the pre-configured traffic rules;
    generating an alert, at the ADV, indicating that a traffic violation has been detected, in response to the detected traffic rule violation; and
    displaying the alert and a graphical representation representing the first vehicle on a display device of the ADV to indicate that the first vehicle has violated a traffic rule.

2. The method of claim 1, wherein the surrounding road traffic information comprises one or more of: lane configuration, road surface markings, traffic light signals, speed, trajectory, relative position of other vehicles, conditions of exterior lights of other vehicles, pedestrians, buildings, obstacles, pedestrian crossings, stop signs, or yield signs.

3. The method of claim 1, further comprising:
automatically capturing an image of the first vehicle using a camera mounted on the ADV, including capturing a license plate of the first vehicle.

4. The method of claim 3, further comprising transmitting the alert and the image of the first vehicle to a predetermined remote server over a network.

5. The method of claim 4, further comprising transmitting at least a portion of the surrounding road traffic information to the predetermined server over the network.

6. The method of claim 3, wherein the first vehicle is located within a predetermined proximity with respect to a rear end of the ADV, and wherein the camera is mounted near the rear end of the ADV.

7. The method of claim 3, further comprising storing the alert, the image of the first vehicle, and the surrounding road traffic information in a persistent storage device maintained by the ADV, including a timestamp of the alert.

8. A non-transitory machine-readable medium having instructions stored therein, which when executed by a processor, cause the processor to perform operations, the operations comprising:
capturing surrounding road traffic information at an autonomous driving vehicle (ADV) based on sensor data obtained from a plurality of sensors of the ADV;
maintaining, at the ADV, a set of pre-configured traffic rules;
automatically detecting at the ADV a traffic rule violation of a first vehicle within a perception range of the ADV based on the surrounding road traffic information and the set of pre-configured traffic rules maintained by the ADV, including analyzing the surrounding road traffic information in view of the pre-configured traffic rules; and
generating an alert, at the ADV, indicating that a traffic violation has been detected, in response to the detected traffic rule violation; and
displaying the alert and a graphical representation representing the first vehicle on a display device of the ADV to indicate that the first vehicle has violated a traffic rule.

9. The non-transitory machine-readable medium of claim 8, wherein the surrounding road traffic information comprises one or more of: lane configuration, road surface markings, traffic light signals, speed, trajectory, relative position of other vehicles, conditions of exterior lights of other vehicles, pedestrians, buildings, obstacles, pedestrian crossings, stop signs, or yield signs.

10. The non-transitory machine-readable medium of claim 8, the operations further comprising:
automatically capturing an image of the first vehicle using a camera mounted on the ADV, including capturing a license plate of the first vehicle.

11. The non-transitory machine-readable medium of claim 10, the operations further comprising transmitting the alert and the image of the first vehicle to a predetermined remote server over a network.

12. The non-transitory machine-readable medium of claim 11, the operations further comprising transmitting at least a portion of the surrounding road traffic information to the predetermined server over the network.

13. The non-transitory machine-readable medium of claim 10, wherein the first vehicle is located within a predetermined proximity with respect to a rear end of the ADV, and wherein the camera is mounted near the rear end of the ADV.

14. The non-transitory machine-readable medium of claim 10, the operations further comprising storing the alert, the image of the first vehicle, and the surrounding road traffic information in a persistent storage device maintained by the ADV, including a timestamp of the alert.

15. A data processing system, comprising:
a processor; and
a memory coupled to the processor to store instructions, which when executed by the processor, cause the processor to perform operations, the operations including
capturing surrounding road traffic information at an autonomous driving vehicle (ADV) based on sensor data obtained from a plurality of sensors of the ADV;
maintaining, at the ADV, a set of pre-configured traffic rules;
automatically detecting, at the ADV, a traffic rule violation of a first vehicle within a perception range of the ADV based on the surrounding road traffic information and the set of pre-configured traffic rules maintained by the ADV, including analyzing the surrounding road traffic information in view of the pre-configured traffic rules; and
generating an alert, at the ADV, indicating that a traffic violation has been detected, in response to the detected traffic rule violation; and
displaying the alert and a graphical representation representing the first vehicle on a display device of the ADV to indicate that the first vehicle has violated a traffic rule.

16. The data processing system of claim 15, wherein the surrounding road traffic information comprises one or more of: lane configuration, road surface markings, traffic light signals, speed, trajectory, relative position of other vehicles, conditions of exterior lights of other vehicles, pedestrians, buildings, obstacles, pedestrian crossings, stop signs, or yield signs.

17. The data processing system of claim 15, the operations further comprising:
automatically capturing an image of the first vehicle using a camera mounted on the ADV, including capturing a license plate of the first vehicle.

18. The data processing system of claim 17, the operations further comprising transmitting the alert and the image of the first vehicle to a predetermined remote server over a network.

19. The data processing system of claim 18, the operations further comprising transmitting at least a portion of the surrounding road traffic information to the predetermined server over the network.

20. The data processing system of claim 17, wherein the first vehicle is located within a predetermined proximity with respect to a rear end of the ADV, and wherein the camera is mounted near the rear end of the ADV.

21. The data processing system of claim 17, the operations further comprising storing the alert, the image of the first vehicle, and the surrounding road traffic information in a persistent storage device maintained by the ADV, including a timestamp of the alert.

* * * * *